Figure 1:
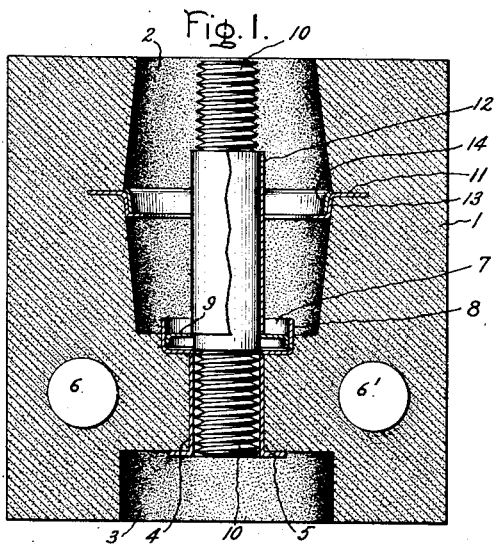

Oct. 27, 1942.  A. W. HULL ET AL  2,299,750
CAST GLASS ARTICLE
Filed Nov. 22, 1939  2 Sheets-Sheet 1

Inventors:
Albert W. Hull,
Roy W. Moore,
by Harry E. Dunham
Their Attorney.

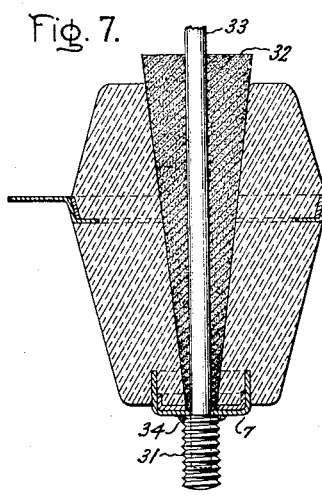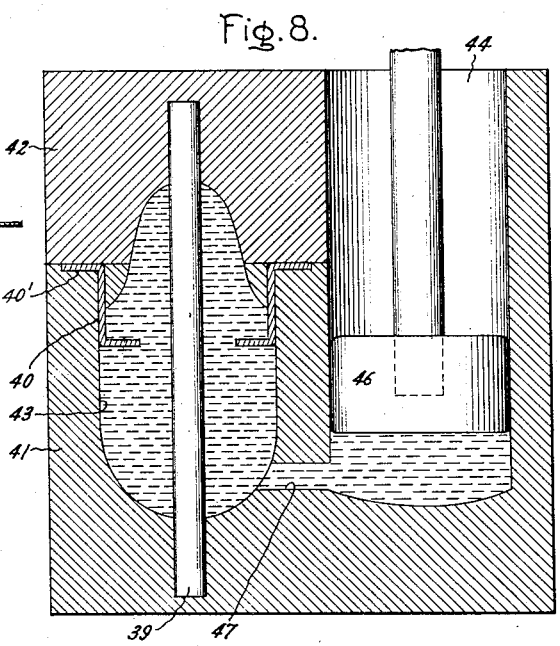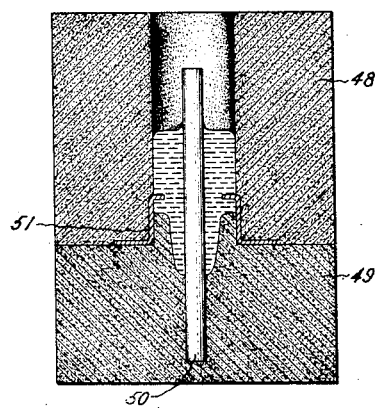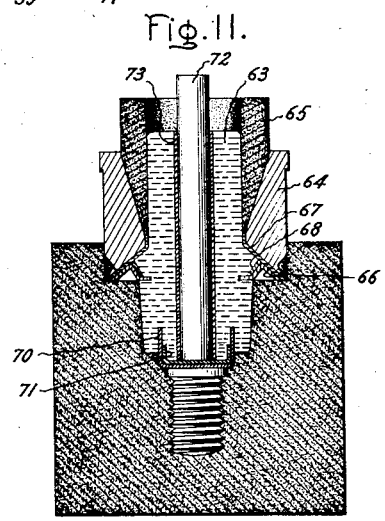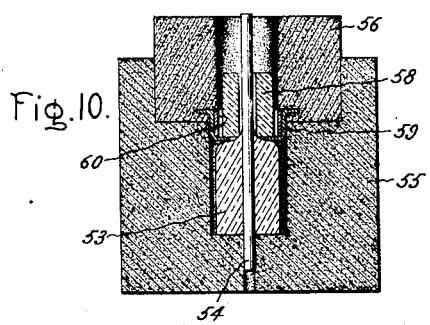
Inventors:
Albert W. Hull,
Roy W. Moore,
by Harry E. Dunham
Their Attorney.

Patented Oct. 27, 1942

2,299,750

UNITED STATES PATENT OFFICE 2,299,750

CAST GLASS ARTICLE

Albert W. Hull and Roy W. Moore, Schenectady, N. Y., assignors to General Electric Company, a corporation of New York Application November 22, 1939, Serial No. 305,666

10 Claims. (Cl. 174—152)

The present invention comprises composite articles of glass and metal, and to a method of fabricating the same. In particular, our invention includes articles of cast glass containing embedded metal members which are chemically united with or bonded to the glass during casting to form integral structures of rugged construction.

It is the main object of our invention to provide strong, gas-tight structures consisting of glass and metal. Such structures may comprise a body of glass which is formed by casting in a mold a highly heated fused glass and causing to be at least partially embedded therein one or more metal inserts, that is, to cause the fused glass to flow around the metal insert on at least three sides. Partially embedded metal members, that is, members portions of which are disposed entirely within the body of the solidified glass in such structures are adapted to be joined by welding, brazing, soldering, or otherwise, to other metal members, as will be explained presently. While our invention is not restricted to the field of electrical devices, it is adapted particularly for providing rugged insulating bushings containing sealed-in electrical conductors. Such bushings are adapted for use in devices which either are evacuated or filled with a gas under pressure. The articles constituting the present invention are fabricated as low-cost, non-separable, integral units and are not limited in size, shape, or thickness of material.

Such articles when fabricated by casting a mass of glass in predetermined form or shape in a mold containing metal inserts result in a portion of the latter being enveloped by and bonded to the glass by becoming "wetted" by the highly liquid cast glass. The glass sticks or adheres to the metal with a molecular cohesiveness which is similar to the cohesiveness holding together the molecules of the glass itself to form a unitary body. For the purposes of this application, we shall call this cohesiveness a chemical bond or union. This term is believed to be an apt one as apparently chemical reaction occurs at the contacting surfaces of the glass and metal members. Ordinarily the glass member constitutes the preponderant part of the fabricated articles, the principal inserts consisting of light metal collars or thimbles.

The novel features of our invention will be described with greater particularity in connection with the accompanying drawings and set forth in the accompanying claims.

Figure 2:
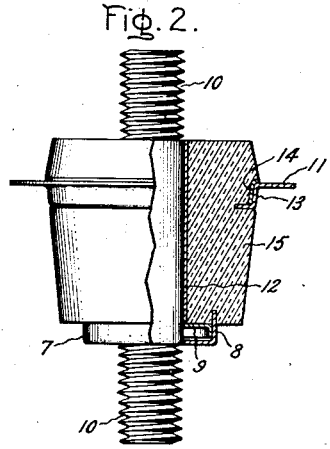
Figure 3:
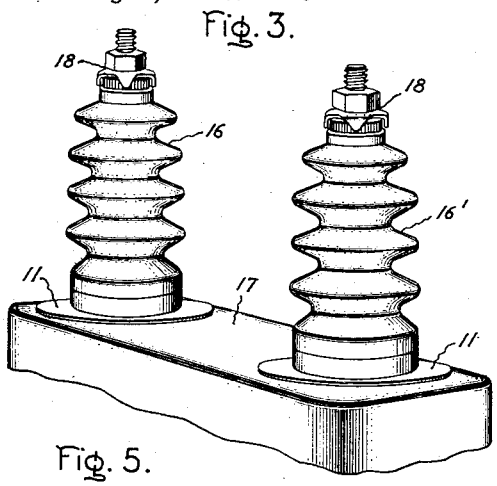

In the drawings, Fig. 1 is a longitudinal section of a mold member and metal inserts positioned for receiving cast glass; Fig. 2 is a side elevation of an electric insulator shown partly in section; Fig. 3 is a perspective view of the cover of a housing for electric device provided with cast insulators made in accordance with our invention; Figs. 4 to 7, inclusive, are vertical sections of modifications, Fig. 7 showing a mold core positioned in a central cavity of a modified insulator; Figs. 8 to 11, inclusive, are vertical sections of modifications showing molds and metal inserts which are intended to form integral parts of completed electric insulators.

The mold member 1 shown in Fig. 1 consists of suitable heat-resisting material, preferably of graphite, and is provided with a cavity 2 in which highly fluid glass is cast. The mold is made in two parts, being split in the plane of section of Fig. 1 so that it can be opened for removal of the casting. The surface of the mold cavity preferably is coated with boron nitride to prevent wetting of the mold surface by the highly fluid cast glass while in the fluid state which would result in sticking to the solidified cast glass article to the mold. This feature of mold construction which applies to the various forms of mold and core constructions herein shown is described and claimed in U. S. Patent 2,201,049, patented May 14, 1940, which is assigned to the same assignee as the present application.

Prior to casting the glass, metal members or inserts, which ordinarily are intended to project outwardly from the contour of the cast glass article, are assembled in predetermined relation in the mold. Below the mold cavity 2 there may be provided a recess 3 for convenience, the upper part of which is lined with a tubular metal member 4 having a flange 5, as indicated, to hold a heavy metal rod or stud 10 in position and to protect the mold from abrasion. The mold also is provided with orifices 6, 6' for receiving guide rods (not shown) on which the halves of the mold slide when the mold parts are assembled.

Resting on the bottom of the mold cavity is a cap or thimble 7 of thin metal having an upturned rim 8 which projects into the mold cavity, hence becoming sealed or bonded to the glass when cast. When joined by brazing or welding to the stud 10, the thimble 7 hermetically seals the opening in the cast glass through which the stud passes. Resting on the cap 7 is an idler ring or shield 9 of sheet metal, the bent rim of which is turned downwardly and is close to the upturned rim 8 of the cap 7. It serves to keep the fluid cast glass away from those parts of the cap 7 which are adjacent the dissimilar metal 10 and which would be constrained thereby during cooling.

Surrounding the portion of the stud 10 which is exposed to the mold cavity is a sleeve 12 which rests on the idler ring 9. It prevents the cast glass from coming in contact with the stud metal to which it might stick, resulting in strain or breakage on cooling because of the unequal contraction of glass and stud metal. Midway in the mold cavity and concentric with the stud 10 is a sheet metal collar 13 which, as shown, has two bends; the inner zone or rim portion projects into the mold cavity, the intermediate zone lies snugly against the mold surface and the outer rim projects outwardly, generally at right angles to the major axis of the mold. Against the inner surface of the intermediate zone lies an idler ring 14 which prevents the cast fluid glass from adhering to the collar 13 at this intermediate zone which in the completed article is flush with the surface as shown in Fig. 2, thus forming an expansion joint. The metal parts 7, 9, 12, 13 and 14 are made of a metal or alloy whose thermal expansion matches that of the glass that is to be used.

When the parts are thus assembled, a suitable glass while highly fluid is cast into the mold cavity. The glass should be superheated above the plastic range of the glass and ordinarily within a range about 1000 to 1200° C. The highly heated glass "wets" and adheres to the exposed metal parts, especially the inwardly projecting parts of the inserts 7 and 13 which, being of small mass, become highly heated by heat imparted from the enveloping glass thus promoting adhesion. Adherence of the exterior surface of the glass to the sleeve 12 and the exposed surfaces of the idlers 9 and 14 also occurs to a considerable extent, but is of less importance. As a result, such metal parts become chemically bonded or welded to the glass (that is, not merely embedded) and hence become an inseparable part of the completed article. The glass and metal should be chosen to match one another in thermal expansion characteristics, at least in the range between normally encountered ambient temperatures and the softening temperature of the glass.

For example, when the inserts consist of an alloy made up of about 58% iron and 42% nickel a glass of the following composition may be used therewith:

| Composition: | Per cent by weight |
| --- | --- |
| $SiO_2$ | 34 |
| $B_2O_3$ | 28 |
| $Al_2O_3$ | 7 |
| PbO | 29 |
| $Na_2O$ | 2 |

Another example of a glass which is suitable for this purpose when used with an alloy containing approximately 14 to 72% iron and 26 to 28% chromium (disregarding minor ingredients) has the following composition:

| Composition: | Per cent |
| --- | --- |
| $SiO_2$ | 54 |
| PbO | 29 |
| $Na_2O$ | 5 |
| $K_2O$ | 8 |
| BaO | 4 |

When the cast glass has solidified, the completed article may be readily removed from the boron-nitride surfaced mold. When the upper part of the cast glass body 15 is trimmed to remove unavoidable excess cast glass, the completed article has the appearance shown in Fig. 2 (a portion of the glass here is shown cut away longitudinally to show structure).

The outer projecting flange 11 of the collar 13 may be joined by welding, brazing, or soldering to the housing or tank of an electrical device, such, for example, as a capacitor or a transformer, the screw-threaded sealed-in central conductors 10 functioning as an electrical terminal. The conductor 10 is joined in any suitable manner to the cap 7, as by welding, soldering, or otherwise, as described in Moore Patent No. 2,201,049.

During the casting operation the idler rings 9 and 14 shield a portion or zone of the metal inserts 7 and 13 from contact with the fluid glass which solidifies while kept out of contact with this zone, whereby parts of the inserts adjacent the sealed-in portion remain unattached or unbonded to the glass. As these unattached parts of the inserts consist of thin-walled metal, they permit expansion and contraction of the inserts without damage to their union with the glass. Even when the thermal expansion characteristics of the glass and metal parts are chosen to match one another, damaging strains otherwise might occur whenever the metal parts are highly heated. For example, when the projecting metal flange 11 of an insulator, such as shown in Figs. 2 and 3, is joined by welding or brazing to a metal tank 17 of an electrical device, the expansion of the metal flange as it is heated would cause damage to the seal unless an intermediate flexing link took up the strain. The idler rings leave the adjacent expanding and contracting portions of the metal inserts free to flex. The idler rings also function as heat distributors when the embedded metal parts are heated, thereby reducing local strains. At the same time, the idler rings act as mechanical spacers to prevent undesired movement or vibration of the connected parts when mounted in operative position.

In Fig. 3 are shown such bushings 16 and 16' (of somewhat modified form). The collars 11 of these bushings are welded or otherwise joined to a metal housing 17. External terminal nuts and washers 18 are provided as usual.

Figure 4:
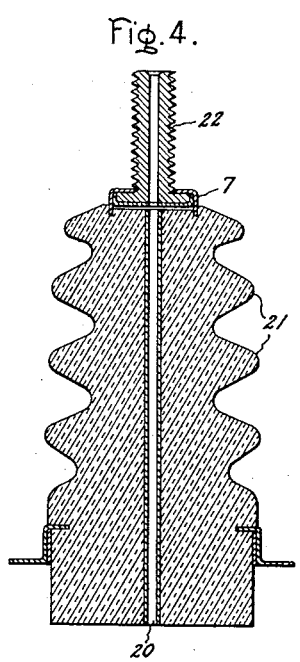

As shown in section, Fig. 4, the structure of the insulated terminals 16, 16' of Fig. 3 differs mainly in the provision of a hollow central metal liner 20 through which a lead or conductor may be inserted and in the provision of external convolutions or petticoats 21 on the exterior of the glass body. The bushing of Fig. 4 has been illustrated inverted with respect to its position in the mold (here not shown). A threaded stud 22 is provided at one extremity to which a conductor passing through the liner 20 may be suitably connected as by soldering.

Figure 5:
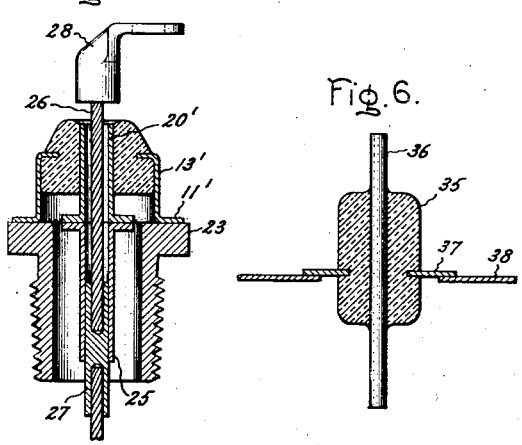

The modification shown in Fig. 5 in some respects resembles a spark plug in construction and is adapted to be held by screw threads in a cooperating socket. The idler rings are omitted and the amount of glass used is so proportioned with respect to the length of the side wall of the insert 13' as to leave an expansible joint between the portion of 13' that is sealed to the glass and the portion 11' that is welded to the metal 23. The outer bent rim 11' is joined by welding, brazing, or soldering to a threaded metal tube 23 which may be screwed into an orifice in a tank or similar device. The insert 13' and central tubular insert 20' consist of chrome-iron alloy. The member 20' which passes completely through the glass member is joined to an iron tube 25 into which a flexible, stranded copper conductor 26 having a solid coupling 27 is brazed or otherwise joined. The function of the solid coupling is to provide a hermetic seal for the tube 20'—25 and thus to render the insulating bushing gas-tight. As shown in the drawings, the conductor 26 otherwise is spaced from the tube 20'. The length of the tube 20'—25 is sufficiently great to protect the glass member from breakage due to stresses occurring during the attachment of the conductor by brazing. Other metals and matching glass can be used in place of chrome-iron. The tube 20'—25 may be made unitary and consist wholly of chrome-iron. The conductor 26 is provided with an electric terminal 28.

The cast insulated bushing shown in Fig. 7 is similar to the bushing of Fig. 2, except that the stud 31 does not extend through the insulator. A graphite core 32 having a metal stem 33 and being externally coated with boron-nitride is shown in its original casting position (the external mold not being shown). The core can be easily removed and a conductor (not shown), which may be rigid or flexible as desired, may be inserted in its place and joined to the threaded stud 31. Stud 31 may be made hollow to receive such conductor, to which it may be joined by a screw thread or by soldering or otherwise. The stud 31 is anchored and sealed to the glass body by the thimble 7, the latter being suitably united with the stud as indicated at 34.

Figure 6:
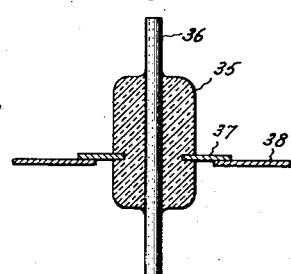

In Fig. 6 is illustrated a simple embodiment of our invention which comprises a mass of cast glass 35 through which extends a conductor 36 and in which also is embedded an outwardly extending insert or collar 37. The conductor 36 and the insert 37 preferably consist of iron. The glass has the following composition which is especially well suited in its thermal expansion characteristics for being used in combination with iron:

| Composition: | Per cent by weight |
|---|---|
| $SiO_2$ | 45.0 |
| $K_2O$ | 14.0 |
| $Na_2O$ | 6.0 |
| $CaF_2$ | 5.0 |
| $PbO$ | 30.0 |

It will be noted that the insert collar 37 is not provided with any bends. This is possible because the metal to which it is to be jointed is the same as that of the collar, namely, iron, and hence introduces no thermal strains. As indicated in Fig. 6, this outwardly extending ring 37 may be joined by welding or otherwise to a metal wall 38 which constitutes part of the housing of an electric device, as shown in connection with Fig. 3.

Various modifications may be made without departing from our invention, as will be explained in connection with several illustrative examples shown in Figs. 8 to 11 inclusive.

As shown, for example, in connection with Fig. 8, a shaped glass article in which a conductor 39 is longitudinally embedded, and a bent collar 40 is circumferentially embedded, may be fabricated in an injection type of mold. The mold consists of separable parts 41, 42 providing a casting cavity 43 and a receiving cavity 44. Fluid glass is introduced into the cavity 44 and then is caused to fill the mold cavity 43 under pressure exerted by a piston 46, the glass flowing through an orifice 47 in the bottom of the mold. The mold is so shaped that a relatively long, bent or curved metal portion of the insert 40 projects beyond the surface of the completed glass article. The projecting part of 40 will constitute, when the extremity 40' thereof is joined to a support such, for example, as a metal housing, an expansion joint permitting expansion and contraction of the metal parts without causing cracking of the glass.

As shown in Fig. 9, a similar article is made by casting highly fluid molten glass into a mold consisting of members 48 and 49. In the mold cavity is located a longitudinal conductor 50 and a sheet metal collar 51 which similarly has a bent portion projecting beyond the surface of the glass.

In some cases it may be desirable to form an article of this kind in two stages. In the first stage, as shown in Fig. 10, a body of glass 53 is cast around the conductor 54 and allowed to solidify. The conductor with the adhering body of glass is then placed in the cavity of a two-part mold consisting of members 55 and 56. A cylindrical body of glass 58 containing a longitudinal cavity through which the conductor 54 passes is assembled together with a metal ring 59 having a plurality of bends as indicated. An idler ring 60 is placed in the position shown adjacent the intermediate zone of the ring 59.

The mold containing the parts thus assembled is placed in a furnace and heated to a temperature at which the glass becomes highly fluid and by its flow in the mold cavity comes into intimate contact with the metal inserts to make a bonded seal therewith. In this operation in which the glass is not required to flow around the obstruction formed by the inwardly projecting portion of the ring 59, it is not necessary to heat the glass to as high a temperature as in a casting operation. A temperature of 800° to 900° C. ordinarily is sufficient to cause the two glass bodies to coalesce, fill out the mold cavity and to form an intimate weld with the metal parts.

The insulator shown in Fig. 11, while in some respects similar to the insulator shown in connection with Figs. 1 and 2, differs in some of its structural aspects. The glass body 63 in this structure is surrounded by a metal wall 64. A hollow graphite mold member 65 is mounted within the metal member 64. The inner rim of a metal collar 66 which has a plurality of bends projects into the mold cavity. A separator ring 67 is welded to the base of the cylindrical member 64 at its outer rim. An idler ring 68 is placed in the position shown. The separator ring 67 prevents the molten glass from coming into contact with the iron member 64. The idler ring 68 keeps the glass from adhering to a portion of the collar 66 so as to produce an expansible joint. In the bottom of the mold is placed a thimble-shaped cap 70 within which is placed an idler ring 71. The stud 72 and the surrounding sleeve 73 are similar to corresponding members described in connection with Figs. 1 and 2.

Certain of the features illustrated in Fig. 11, including specifically the use of a metallic part corresponding to the part 64 for backing up the structure of a multipart seal of the type described in order to protect the seal from mechanical stresses, are the prior invention of Chauncey G. Suits and are particularly claimed by him in his application S. N. 415,484, filed October 17, 1941. These features are not intended to be claimed herein.

Insulating electric bushings made in accordance with our invention have been found under test to be gas-tight when subjected to gas under pressure over as wide a range of temperatures as −50° to 140° C. They are suitable for use not only in devices containing compressed gas, but also in electric devices containing chlorinated hydrocarbons which are more difficult to confine than mineral oil.

What we claim as new and desire to secure by Letters Patent of the United States is:

1. A bushing for an electrical device comprising an elongated approximately cylindrical body of glass which is provided with a longitudinal bore, a metal tube passing through said bore and being bonded to said glass body, a conductor passing through said tube, an externally projecting stud electrically connected to said conductor, a thimble mounted on said stud and embedded in said glass body and a collar of metal, the inner peripheral zone of which is embedded in and bonded to said glass body, and the outer peripheral zone of which extends outwardly from the contour of said glass body at a region intermediate the ends thereof.

2. An electric bushing comprising a body of glass, a conductor extending through said glass body, a metal thimble joined hermetically to said glass body and said conductor, a collar of sheet metal having an inner edge encircling and embedded in said body of glass, an outer edge extending away from the general contour of said body, and an intermediate portion being flush with but unbonded to the exterior of said glass body.

3. An electric bushing comprising a generally cylindrical glass body, a conductor extending through and projecting beyond the ends of said glass body, a collar of metal having a rim sealed into said glass body and extending therefrom, said collar having a portion bent transversely to the plane of the embedded portion and encircling the exterior of said glass body, and a metal shielding ring interposed between the encircling portion of said collar and said glass body, said ring being positioned under an adjacent zone of said collar to permit said zone to flex when said collar expands or contracts.

4. An article of manufacture comprising a preformed body of glass, a metal collar of sheet material having a rim portion extending at an angle to an adjacent portion, said rim portion being embedded in said glass body, and a shielding ring of metal which is located between the adjacent surfaces of said glass body and said metal collar and being bonded to said glass body while being unattached to said collar.

5. An electrical bushing comprising an elongated glass body, a conductor extending therethrough, a thimble-shaped collar having one rim joined to said conductor and the opposite rim embedded in said glass body, and a shielding collar lying closely adjacent and under said first collar and shielding the adjacent surface of said first-named collar from said glass body, and being bonded only to said glass body, thereby permitting motion of said first collar with respect to said glass body.

6. An electric bushing comprising a glass body, a conductor extending therethrough, a thimble-shaped collar of metal joined to said conductor at the inner peripheral rim thereof and being embedded in said glass at one peripheral edge thereof, and a shielding and spacing metal member lying closely adjacent said collar, but free to move relative thereto, said member being bonded to said glass body and being interposed between said glass body and said collar thereby permitting said metal collar to expand and contract without breakage in response to thermal changes adjacent said embedded portion.

7. An electric bushing comprising a glass body, a conductor extending therethrough, an encircling collar having an inner rim joined to said conductor, the outer rim being gripped by and bonded to said glass body, and a shielding ring which is unattached to said collar and lying between said sealing collar and said glass body whereby relative motion without damage is permitted between said sealing collar and said glass body.

8. An electric bushing comprising a glass body, a metal collar encircling said glass body, extending outwardly therefrom, and having an inner rim sealed to said glass body, said collar also having an intermediate portion bent transversely to the plane of the embedded rim and a metal shielding ring being unattached to said collar and being interposed between said intermediate portion of said collar and said glass body.

9. An electric bushing comprising an elongated body of glass having a longitudinal cavity, an elongated metal tube extending through said cavity and being exteriorly bonded to said glass body, a stud for making electric connection projecting from said glass body at an end of said metal tube, a metal thimble joined hermetically to said glass body and said stud, and a collar of sheet metal having an inner edge encircling and embedded in said body of glass at a region displaced longitudinally with respect to said stud, an outer edge extending away from the general contour of said body, and an intermediate portion which is flush with but unbonded to the exterior of said glass body.

10. An electric bushing comprising an elongated body of glass having therethrough a longitudinal channel, a metal rod extending through said channel, a thin, elongated metal shield surrounding said rod and spaced therefrom, said shield having substantially the same coefficient of expansion as said glass and having the exterior surface thereof bonded to said glass, a metal thimble joined hermetically to said glass body and said rod, and a collar of sheet metal having an inner edge encircling and embedded in said body of glass, an outer edge extending away from the general contour of said body, and an intermediate portion which is flush with but unbonded to the exterior of said glass body.

ALBERT W. HULL.
ROY W. MOORE.